(12) United States Patent
Luan et al.

(10) Patent No.: US 12,220,670 B2
(45) Date of Patent: Feb. 11, 2025

(54) CARBON DIOXIDE MEMBRANE FILTER WITH GRAPHENE CROWN PORES

(71) Applicant: International Business Machines Corporation, Armonk, NY (US)

(72) Inventors: Binquan Luan, Chappaqua, NY (US); Bruce Gordon Elmegreen, Goldens Bridge, NY (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 17/701,040

(22) Filed: Mar. 22, 2022

(65) Prior Publication Data

US 2023/0145516 A1    May 11, 2023

Related U.S. Application Data

(60) Provisional application No. 63/276,751, filed on Nov. 8, 2021.

(51) Int. Cl.
  B01D 71/02    (2006.01)
  B01D 53/22    (2006.01)
  (Continued)

(52) U.S. Cl.
  CPC ......... B01D 71/021 (2013.01); B01D 53/226 (2013.01); B01D 67/0062 (2013.01); B01D 69/02 (2013.01); B01D 69/10 (2013.01); C01B 32/50 (2017.08); B01D 2325/021 (2013.01); B01D 2325/08 (2013.01)

(58) Field of Classification Search
  CPC ...... B01D 71/021; B01D 69/10; B01D 69/02; B01D 67/0062; B01D 53/226; B01D 2325/08; B01D 2325/021; C01B 32/50
  See application file for complete search history.

(56) References Cited

U.S. PATENT DOCUMENTS 7,575,624 B2 *    8/2009    Cartwright ............. B01D 53/04
                                                           96/144
9,522,351 B2      12/2016   Lescoche
(Continued)

FOREIGN PATENT DOCUMENTS

KR        20190130229 A    11/2019

OTHER PUBLICATIONS

He et al. (High-permeance polymer-functionalized single-layer graphene membranes that surpass the postcombustion carbon capture target, 2019, Energy and Environmental Science, vol. 12, pp. 3305-3312) (Year: 2019).*

(Continued)

*Primary Examiner* — Youngsul Jeong
(74) *Attorney, Agent, or Firm* — Scully, Scott, Murphy & Presser, P.C.; Kelsey M. Skodje

(57) ABSTRACT

A structure and method for carbon capture, e.g., in flue gas. An oxygen-terminated crown pore in graphene can be provided. Exposed carbon atoms on the pore edge can be bonded with oxygen to make a crown pore. When the $CO_2$ is inside the pore, the electrostatic interaction becomes attractive because the positively charged carbon atom in $CO_2$ is now exposed to negatively charged oxygen atoms on the crown pore edge. A favorable interaction between $CO_2$ and the crown pore can be expected.

20 Claims, 8 Drawing Sheets

(51) Int. Cl.
    *B01D 67/00*     (2006.01)
    *B01D 69/02*     (2006.01)
    *B01D 69/10*     (2006.01)
    *C01B 32/50*     (2017.01)

(56) References Cited

U.S. PATENT DOCUMENTS

| | | | |
|---|---|---|---|
| 9,981,212 | B2 | 5/2018 | Kim et al. |
| 10,603,650 | B2 * | 3/2020 | Walavalkar .......... B01J 19/0046 |
| 2021/0225584 | A1 | 7/2021 | Catalano |

OTHER PUBLICATIONS

Shan et al. (Influence of chemical functionalization on the CO2/N2 separation performance of porous graphene membranes, 2012, Nanoscale, vol. 4, pp. 5477-5482). (Year: 2012).*
Ren et al. (Nonprecious catalytic honeycombs structured with three dimensional hierarchical Co3O4 nano-arrays for high performance nitric oxide oxidation, 2013, Journal of Materials Chemistry A, vol. 1, pp. 9897-9906). (Year: 2013).*
Liu et al. (Preparation and mechanical properties of graphene nanosheet reinforced alumina composites, 2012, Advanced Engineering Materials, vol. 17, No. 1, pp. 28-35). (Year: 2012).*
Ferrigno et al. (A monitorable and renewable pollution filter based on graphene nanoplatelets, 2020, Nanotechnology 31 (2020) 075701) (Year: 2020).*
Geim, A.K., et al., "The rise of graphene", Nature Materials, Mar. 2007, pp. 183-191, vol. 6.
Fang, A., et al., "Highly mechanosensitive ion channels from graphene-embedded crown ethers", Nature Materials, Jan. 2019, pp. 76-81, vol. 18.
Acar, E.T., et al., "Biomimetic potassiumselective nanopores", Science Advances, Submitted Aug. 29, 2018, Accepted Dec. 21, 2018, Published Feb. 8, 2019, pp. 1-7, 5 (2).
Sahu, S., et al., "Optimal transport and colossal ionic mechanoconductance in graphene crown ethers", Science Advances, Submitted Jan. 8, 2019, Accepted Jun. 10, 2019, Published online Jul. 12, 2009, pp. 1-7, 5(7).
Boretti, A., et al., "Outlook for graphene-based desalination membranes", Nature Partner Journals Clean Water (2018), Received Jan. 18, 2017, Revised Aug. 21, 2017, Accepted Sep. 11, 2017, Published online May 24, 2018, pp. 1-11, 8.
He, G., et al., "High-permeance polymer-functionalized single-layer graphene membranes that surpass the postcombustion carbon capture target", Energy and Environmental Science, Received Apr. 18, 2019, Accepted Jul. 15, 2019, pp. 3305-3312, 12.
Koenig, S.P., et al., "Selective molecule sieving through porous graphene", Nature Nanotechnology, Nov. 2012, Published Online Oct. 7, 2012, pp. 728-732, vol. 7.
Lee, J.U., et al., "Estimation of Young's Modulus of Graphene by Raman Sepctroscopy", Nano Letters, Received Mar. 19, 2012, Revised Jun. 20, 2012, Published Aug. 6, 2012, pp. 4444-4448, 12.
Kim, H.W., et al. 2013 "Selective Gas Transport Through Few-Layered Graphene and Graphene Oxide Membranes" Science, Oct. 4, 2013, pp. 91-95, vol. 342.
Nair, R.R., et al., "Unimpeded Permeation of Water Through Helium-Leak-Tight Graphene-Based Membranes" Science, Jan. 27, 2012, pp. 442-444, vol. 335.
Guo, J., et al., "Crown Ethers in Graphene", Nature Communications, Received Apr. 25, 2014, Accepted Sep. 26, 2014, Published Nov. 13, 2014, pp. 1-6, 5:5389.
O'Hern, S.C., et al., Selective Ionic Transport through Tunable Subnanometer Pores in Single-Layer Graphene Membranes, Nano Letters, Mar. 12, 2014, 27 pages, vol. 14, No. 3.
Yuan, Z., et al., "Predicting Gas Separation through Graphene Nanopore Ensembles with Realistic Pore Size Distributions", ACS Nano 2021, Received Nov. 10, 2020, Accepted Jan. 6, 2021, Published Jan. 13, 2021, pp. 1727-1740, 15.

Huang, S., et al., "Millisecond lattice gasification for high-density CO2- and O2-sieving nanopores in single-layer graphene", Science Advances 2021, Submitted Oct. 1, 2020, Accepted Jan. 12, 2021, Published Feb. 24, 2021, pp. 1-12, 7(9).
Chowdhury, M.H.M., "Simulation, Design and Optimization of Membrane Gas Separation, Chemical Absorption and Hybrid Processes for CO2 Capture", PhD Dissertation, University of Waterloo, 2011, 407 pages.
Lin, H., et al., "The Membrane Solution to Global Warming", 6th Annual Conference on Carbon Capture & Sequestration, May 7-10, 2007, 15 pages.
Sada, E., et al., "Separation of carbon dioxide by asymmetric hollow fiber membrane of cellulose triacetate", Journal of Applied Polymer Science, 1992, Received Sep. 10, 1991, Accepted Oct. 30, 1991, pp. 2181-2186, vol. 45.
Internation Energy Agency, "Global Energy and CO2 Status Report", https://www.iea.org/reports/global-energy-co2-status-report-2019/emissions, Accessed on Mar. 18, 2022, 29 pages.
Asen, E., "Carbon Taxes in Europe", Tax Foundation, https://taxfoundation.org/carbon-taxes-in-europe-2020/, Oct. 8, 2020, 5 pages.
New York University, "How to calculate the social cost of carbon? Researchers offer roadmap in new analysis", https://phys.org/news/2021-02-social-carbon-roadmap-analysis.html, Feb. 19, 2021, 2 pages.
Chu, J., "Graphene holds up under high pressure", MIT News, https://news.mit.edu/2017/graphene-high-pressure-desalination-more-productive-0424, Apr. 24, 2017, 4 pages.
MSE Supplies, "Suspended Monolayer Graphene Film on TEM Grids", https://www.msesupplies.com/products/suspended-monolayer-graphene-on-tem-grids?currency=USD&variant=33154926415&utm_medium=cpc&utm_source=google&utm_campaign=Google%20Shopping&gclid=Cj0KCQiAv6yCBhCLARIsABqJTjbu52WyORXFAMXsqCmCGI1B7tAKZ0hfr9CBb_B1vlqseK08zTRgrLwaAstTEALw_wcB, Accessed on Mar. 18, 2022, 5 pages.
Clemente, J., "Global Natural Gas Electricity Is Gaining On Coal", Forbes, https://www.forbes.com/sites/udeclemente/2019/12/15/global-natural-gas-electricity-is-gaining-on-coal/?sh=61ecdb407bfd, Dec. 15, 2019, 5 pages.
ACS Material, "Graphene Facts", https://www.acsmaterial.com/graphene-facts, Accessed on Mar. 22, 2022, 2 pages.
Smolyanitsy, "Nanopores in Atomically Thin 2D Nanosheets Limit Aqueous Single-Stranded DNA Transport", Physical Review Letters (2021), Received Oct. 31, 2020, accepted Aug. 12, 2021, published Sep. 24, 2021, pp. 138103-1-138103-6, 127.
Ali, A., et al., "Graphene-based membranes for CO2 separation", Materials Science for Energy Technologies (2019), Received Sep. 30, 2018, Revised Nov. 7, 2018, Accepted Nov. 8, 2018, Available online Nov. 15, 2018, pp. 83-88, 2.
He, G., et al., "Supplementary Information: High-permeance polymer-functionalized single-layer graphene membranes that surpass the postcombustion carbon capture target", Electronic Supplementary Material (ESI) for Energy & Environmental Science, The Royal Society of Chemistry, 2019, 23 pages.
Jiang, D.-E., et al., "Porous Graphene as the Ultimate Membrane for Gas Separation", Nano Letters 2009, Received Jul. 9, 2009, Revised manuscript received Sep. 8, 2009, Published on Web Sep. 23, 2009, pp. 4019-4024, vol. 9, No. 12.
Shan, M., et al., "Influence of chemical functionalization on the Co2/N2 separation performance of porous graphene membranes", Nanoscale 2012, Received Jun. 5, 2012, Accepted Jul. 10, 2012, pp. 5477-5482, 4.
Juang, S., et al., "Single-layer graphene membranes by crack-free transfer for gas mixture separation", Nature Communications, Feb. 13, 2018, Accepted May 24, 2018, Published online Jul. 6, 2018, pp. 1-11, 9:2632.
Wang, X., et al., "N-Doping of Graphene Through Electrothermal Reactions with Ammonia", Science, May 8, 2009, Erratum Post date Sep. 17, 2010, pp. 768-771, vol. 324.
Xue, Q., et al., "N-doped porous graphene for carbon dioxide separation: a molecular dynamics study", Chinese Science Bulletin, Oct. 2014, pp. 3919-3925, vol. 59, Issues 29-30.

(56) References Cited

OTHER PUBLICATIONS

International Search Report dated Feb. 8, 2023 issued in PCT/EP2022/079834, 18 pages.

* cited by examiner

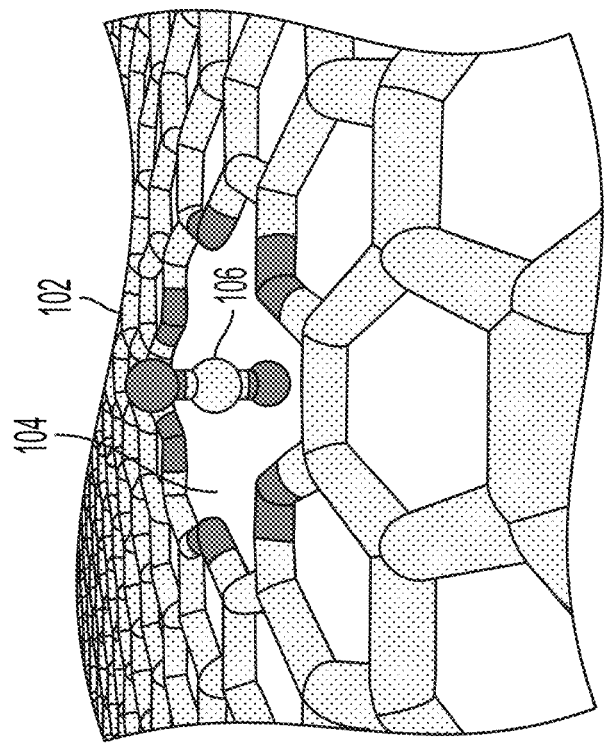
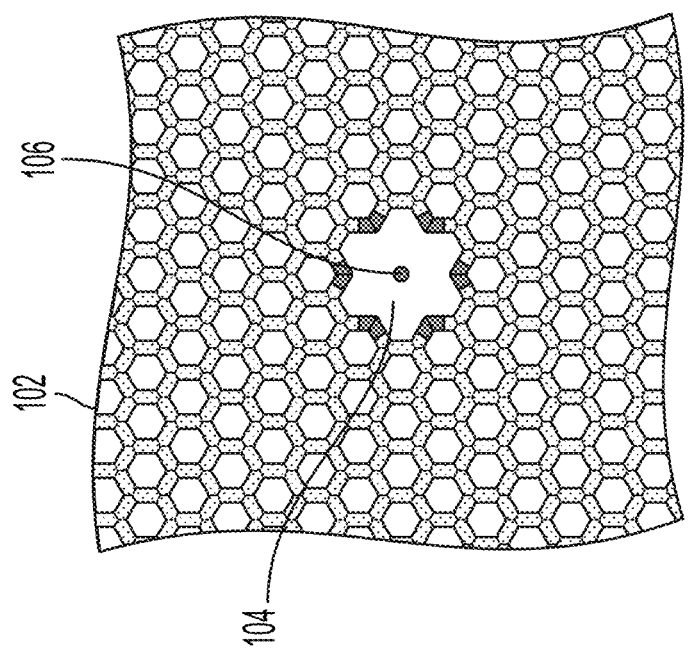
FIG. 1B
FIG. 1A

CARBON DIOXIDE MEMBRANE FILTER WITH GRAPHENE CROWN PORES

CROSS-REFERENCE TO RELATED APPLICATIONS

This application claims the benefit of U.S. Provisional Application No. 63/276,751, filed on Nov. 8, 2021, which is incorporated by reference herein in its entirety.

BACKGROUND

The present application relates generally to green environment and particularly to carbon dioxide filtering, for example, carbon capture (CC) in flue gas, structure, apparatus and methods thereof.

Carbon dioxide (CO2 or $CO_2$) capture from power plant and industrial flue gas is a step toward reducing the emission of greenhouse gas into the atmosphere. Methods for carbon capture (CC) include absorption by liquids, adsorption by solids including metal organic frameworks, and filtering from other molecules by membranes. Generally, the goal of CC is to sequester the carbon dioxide as a first step in a carbon removal process, after which it is either stored in some stable form for millennia or reused in an industry, such as enhanced oil recovery, beverages or plastics. The downstream industry may need various degrees of purity for the carbon dioxide. Long term storage usually involves compression or chilling to a liquid form before moving it in pipelines or trucks, and the energy needed for compression or chilling is minimized if the $CO_2$ is not contaminated with other gases. Beverage use should have high purity for human consumption. Plastic use should have purity to optimize the required chemical reactions. Flue gas is a mixture of air from the intake before combustion, which is mostly nitrogen and oxygen, plus the products and residuals from combustion, which are generally water and carbon dioxide if hydrocarbons are burned, but also the combustion products of other elements in the fuel such as oxides of sulfur and nitrogen along with various incombustibles if the fuel is impure.

BRIEF SUMMARY

The summary of the disclosure is given to aid understanding of an apparatus and method of carbon dioxide membrane filtering with graphene crown pores, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the apparatus, structure and method of operations to achieve different effects.

In an aspect, a carbon dioxide membrane filter can include at least one graphene sheet interspersed with holes that have open carbon bonds. The open carbon bonds can be filled with another element, where each of the holes which are tipped with another element results in, or makes up, a crown pore. In one aspect, another element can be oxygen. In another aspect, another element can be nitrogen.

In another aspect, the carbon dioxide membrane filter can also include a porous substrate. The graphene sheet can be placed on the porous substrate for support, for example, against driving pressure. In an aspect, the porous substrate can have a honeycomb-like array of channels. In another aspect, the porous substrate can have an anodic aluminum oxide pore-structure.

In another aspect, the crown pore can be created by taking away six carbon atoms from the graphene sheet and replacing carbon edges of a hole created by removal of the six carbon atoms with atoms of another element.

In yet another aspect, the graphene sheet can have an irregular mesh shape. Yet in another aspect, the graphene sheet can be stretched to enlarge the crown pore.

In still another aspect, the carbon dioxide membrane filter can include multiple graphene sheets arranged in series.

In another aspect, a carbon dioxide membrane filter can include a graphene sheet of carbon in a repeated hexagonal pattern. The graphene sheet can have holes, for example, interspersed, where the holes have open carbon bonds filled with another element. Each of the holes tipped or bonded with another element can result in or make up a crown pore. The graphene sheet can be shaped to a cylindrical structure having a zig-zag surface pattern with crown pores. Carbon dioxide can be permitted to enter, via the crown pores, from a first side of the cylindrical structure to a second side of the cylindrical structure, where the first side and the second side have different pressures. In one aspect, the first side can be the outside of the cylindrical structure and the second side can be the inside of the cylindrical structure, where the outside has higher pressure than the inside. In another aspect, the first side can be the inside of the cylindrical structure and the second side can be the outside of the cylindrical structure, where the inside has higher pressure than the outside.

In yet another aspect, a graphene sheet can have at least one hole, where edges of a hole have exposed carbon atoms bonded with another element, which can result in a crown pore. In one aspect, another element can be oxygen. In another aspect, another element can be nitrogen.

In still yet another aspect, a method of fabricating a carbon dioxide membrane filter can include causing ion-beam-sculpting on a graphene supported by a porous substrate. The method can also include performing oxidative etching to enlarge pores in the graphene, where carbon atoms exposed at the edges of the pores are bonded with another element.

In another aspect, a method of carbon capture can include filtering carbon dioxide from flue gas using graphene having pores tipped with oxygen, where the flue gas is provided in an area of a first side of the graphene, and the carbon dioxide in the flue gas is caused to be transported to an area of a second side of the graphene via at least one of the pores.

In another aspect, a method of carbon capture can include filtering carbon dioxide from flue gas using multiple layers of graphene having pores tipped with oxygen, where the flue gas is provided in an area of a first side of the graphene, and the carbon dioxide in the flue gas is caused to be transported to an area of a second side of the graphene via at least one of the pores.

Advantageously, the carbon dioxide membrane filter with graphene crown pores in one or more embodiments can provide higher selectivity for separating carbon dioxide from nitrogen and other gases, and higher permeance for carbon dioxide at this selectivity. Another benefit is that a chemically stable filter can be provided for filtering carbon dioxide.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIGS. 1A and 1B illustrate, in an embodiment, a single 18-crown-6 pore in graphene.

DETAILED DESCRIPTION

Figure 2:
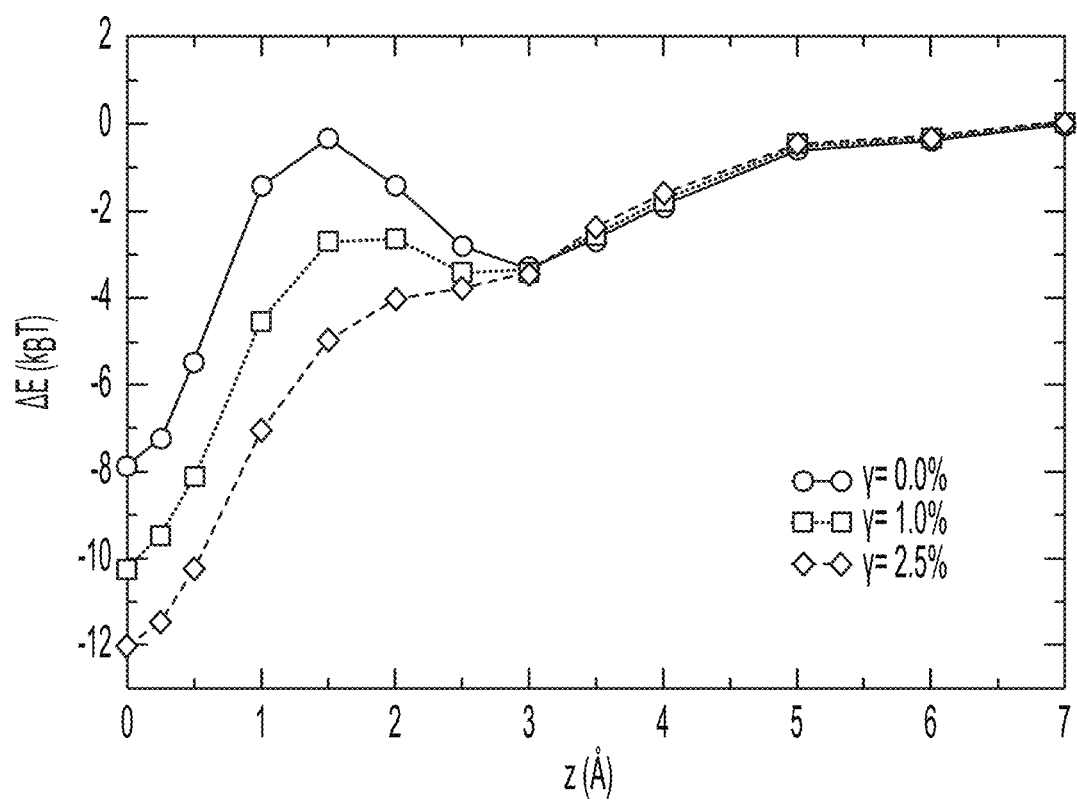
FIG. 2 shows in an embodiment, the potential energy for the interaction between carbon dioxide and a graphene crown pore as a function of their separation, z.

Carbon capture (CC) in flue gas separates carbon dioxide gas from the other main gases, which can be nitrogen and water with trace amounts of other molecules such as sulfur dioxide, nitrogen dioxide, and so on. In an embodiment, a filter structured at the atomic level can be provided that passes carbon dioxide gas and blocks nitrogen gas ($N_2$). FIG. 1A and FIG. 1B illustrate graphene with a pore in an embodiment. For illustration purposes only, a single pore is shown. In an embodiment, the filter can be made of graphene, which is sheet-like pure carbon in a repeated hexagonal pattern 102, interspersed with holes (e.g., 104) that have their open carbon bonds filled with another element, taken to be oxygen in one embodiment of the invention. These holes in graphene are crown pores (shown in FIG. 1A and FIG. 1B), named after ether crowns. In an embodiment, the carbon atoms at the pore edge are fully oxidized with oxygen atoms in the graphene plane, which guarantees the stability of the pore structure in the flue gas condition. Another possible use for crown pores in graphene is the ion channel (e.g. selective for $K^+$). For example, the 18-crown-6 nanopore (FIG. 1A) is terminated with six oxygen atoms that are slightly negatively charged because of their electron structure with the bonded carbon atoms, and this charge provides a 2D-cage for positively charged particles (such as positively charged ions in an electrolyte). $CO_2$ is a linear molecule with one positively charged carbon atom in the middle. Electrostatically, it is foreseeable that a $CO_2$ molecule can be stably bound inside the crown pore. The crown pore can be considered as a specially functionalized graphene pore that is $CO_2$-philic. Differently from previously suggested porous films for $CO_2$ separation, an embodiment of the invention may apply crown pores in graphene disclosed herein to separate $CO_2$ from other flue gas molecules such as $N_2$. For example, crown pores in graphene can be applied to trap or filter $CO_2$. In an embodiment, it can also be chemically possible to replace all six oxygen atoms on the edge of a crown pore with six nitrogen atoms. The nitrogen atoms on the pore edge can contain more negative charges than oxygen atoms, which may further improve the attractive interaction between $CO_2$ and a crown pore. Configurations other than 18-crown-6 nanopore shown in FIGS. 1A and 1B are possible.

In an embodiment, functionalized graphene with oxygen, e.g., oxygen-crown pores, can be provided. In an embodiment, oxygen-crown pore may select molecules by electronic charge. In an embodiment, a $CO_2$ molecule (e.g., 106) can be trapped in the oxygen-crown pore.

In an embodiment, oxygen-terminated crown ether pores in graphene can be provided. Even though $CO_2$ and $N_2$ have similar molecule-sizes, oxygen-terminated crown pores have special electrostatic interactions with $CO_2$ but not with other gas molecules in the flue gas, which promotes the selective transport of $CO_2$ through crown pores. An embodiment of the structure, method can use the charge distribution at the edge of a pore (e.g., crown pores), in particular the Coulomb force, to separate molecules that pass through the pore from molecules that cannot.

In an embodiment, oxygen-terminated crown pore in graphene disclosed herein can be implemented or used for the air environment, and it can also be for charge-neutral molecules, e.g., $CO_2$, which nevertheless have an internal charge distribution (C: 0.8 e and O: −0.4e, where e is the elementary charge) that causes the oxygen-terminated crown pore to selectively attract part of the molecule and repel another part. For certain charge-neutral molecules, the attraction at close range overwhelms the repulsion at close range and the molecule is actively pulled into the pore, whereupon it can easily go through with a high enough initial energy or after a collision by another particle.

In an oxygen-terminated crown pore in graphene, the exposed carbon atoms on the pore edge are bonded with oxygen to make a crown (e.g., but not limited to, 18-6) pore. Because of the distribution of electrons in the chemical bond, the carbon atoms near the pore are slightly positively charged while the oxygen atoms have a slightly negative charge, which can electrostatically affect nearby molecules outside the graphene (along with the van der Waals interaction). Carbon dioxide is a linear molecule with an oxygen at each end and carbon in the middle. The oxygens in the $CO_2$ are slightly negatively charged while the carbon atom is positively charged. When the $CO_2$ is inside the pore, the electrostatic interaction becomes attractive because the positively charged carbon atom in $CO_2$ is now exposed to negatively charged oxygen atoms on the crown pore edge. For instance, a favorable interaction can be expected between $CO_2$ and the crown pore. In an aspect, this can indicate that the crown pore can be highly selective for the $CO_2$ transport and block other gas molecules in the flue gas.

FIGS. 1A and 1B show, in an embodiment, illustration of a single 18-crown-6 pore in graphene made by taking away six carbon atoms and replacing the pore edge with oxygen atoms, and a $CO_2$ molecule trapped in the center of the crown pore at the local potential minimum. FIG. 1A shows the top view. FIG. 1B shows the tilted side view. Other crown pore configurations are possible.

In an embodiment, the crown pore with a $CO_2$ molecule inside is illustrated in FIGS. 1A and 1B. Density functional theory (DFT) based calculations can be carried out to obtain the potential energy of this interaction as a function of $CO_2$ distance from the midplane. FIG. 2 shows the results. The units on the ordinate are the energy $k_BT$ relative to the energy at a temperature T of 298 K. $k_B$ stands for the Boltzmann constant. The potential energy is zero at large distance and it first reduces as the $CO_2$ gets closer to the graphene due to the long-range van der Waals interaction. When entering the small crown pore (z~1.5-3 Å), the repulsive electrostatic interaction yields a small energy barrier relative to the minimum slightly further out, although the peak of this barrier is less than the energy at infinity. The interaction becomes attractive once $CO_2$ gets sufficiently close to the plane of the graphene. On the other side of the barrier, the potential energy decreases, forming a stable trap if the $CO_2$ has a low total energy. This minimum energy occurs because the electrostatic repulsion between the crown pore and the oxygens at the end of the $CO_2$ is overwhelmed by the electrostatic attraction between the crown pore and the carbon in the middle of the $CO_2$. FIG. 1B shows the atomic configuration for this.

FIG. 2 shows the potential energy for the interaction between carbon dioxide and a graphene crown pore as a function of their separation, z. The potential energy can be measured in units of $k_B T$ for Boltzmann constant $k_B$ and fiducial temperature T=298 K. The separation from the molecule's center of mass to the graphene plane is measured in units of Angstroms. Gamma γ is the relative stretching factor of the graphene, ΔL/L for length L with an extension of ΔL. For γ=0.0% there is a potential barrier relative to the minimum further out (~3 $k_B T$) that may prevent an impingent $CO_2$ molecule from entering the pore. This barrier is less than the $CO_2$ energy at infinity, corresponding to 0 on the ordinate and 298 K with normalization. At γ>1.0%, the barrier decreases significantly, and the $CO_2$ can pass through without impediment.

Figure 3:
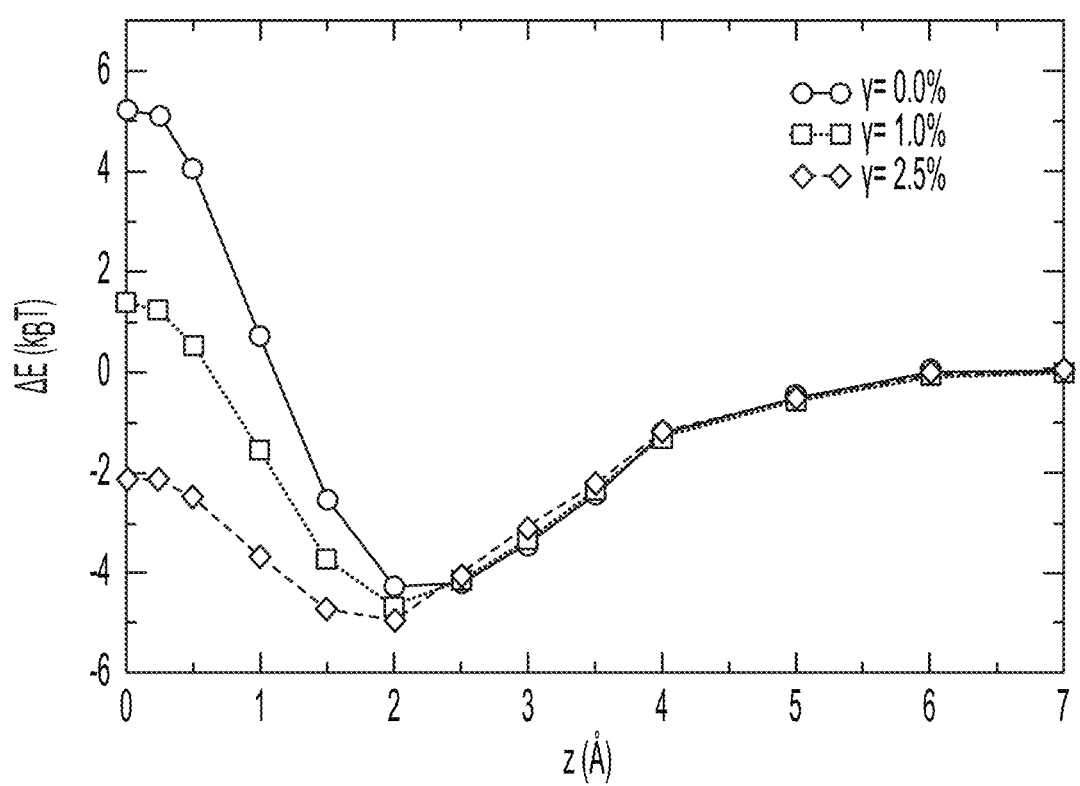
FIG. 3 shows potential energy distribution for $N_2$ as a function of distance to the crown pore.

The results for nitrogen gas ($N_2$) are shown in FIG. 3. Despite the initial attraction to graphene giving the negative dip in the potential at 2 Å distance, nitrogen gas is repelled at close range from the crown pore by van der Waals forces rather than Coulomb forces, because the hole is too small for nitrogen to go through at all but the highest stretching factors, γ. The calculated energy for $N_2$ to approach the crown pore is about 9.5 $k_B T$ (from the bottom of the potential well to the top of the barrier at z=0), for T in units of 298K.

FIG. 3 shows potential energy distribution for $N_2$ as a function of distance to the crown pore. The Potential well centered at around 2-Å distance is due to the long-range van der Waals attraction between $N_2$ and graphene. At smaller distances, there are always energy barriers (repulsive to $N_2$) due to the small pore-size for a $N_2$ molecule. The barrier for stretched graphene is less because of the slightly enlarged pore.

Generally, there can be two consecutive steps for a gas molecule to enter the pore. Firstly, a $CO_2$ or $N_2$ molecule will be attracted by graphene and then diffuse laterally near the graphene surface. During this step, the energy change is ~4 $k_B T$ for the $CO_2$ molecule (FIG. 2). Secondly, the $CO_2$ molecule could be further attracted into the crown pore, while the $N_2$ molecule is repelled by the pore. During this process, there is another energy reduction of about ~4 $k_B T$ for the $CO_2$ molecule (FIG. 2). With positive initial energy from the thermal motion of the $CO_2$, equal to 1 $k_B T$ in the units of FIG. 2, the $CO_2$ should overcome the short-range van der Waals barrier and enter the pore. If there is relatively little energy loss, it should continue through the pore and out the other side. After energy loss from collisions with the graphene, the $CO_2$ could get trapped in the potential well and stay there until another $CO_2$ molecule knocks it out.

Figure 4:
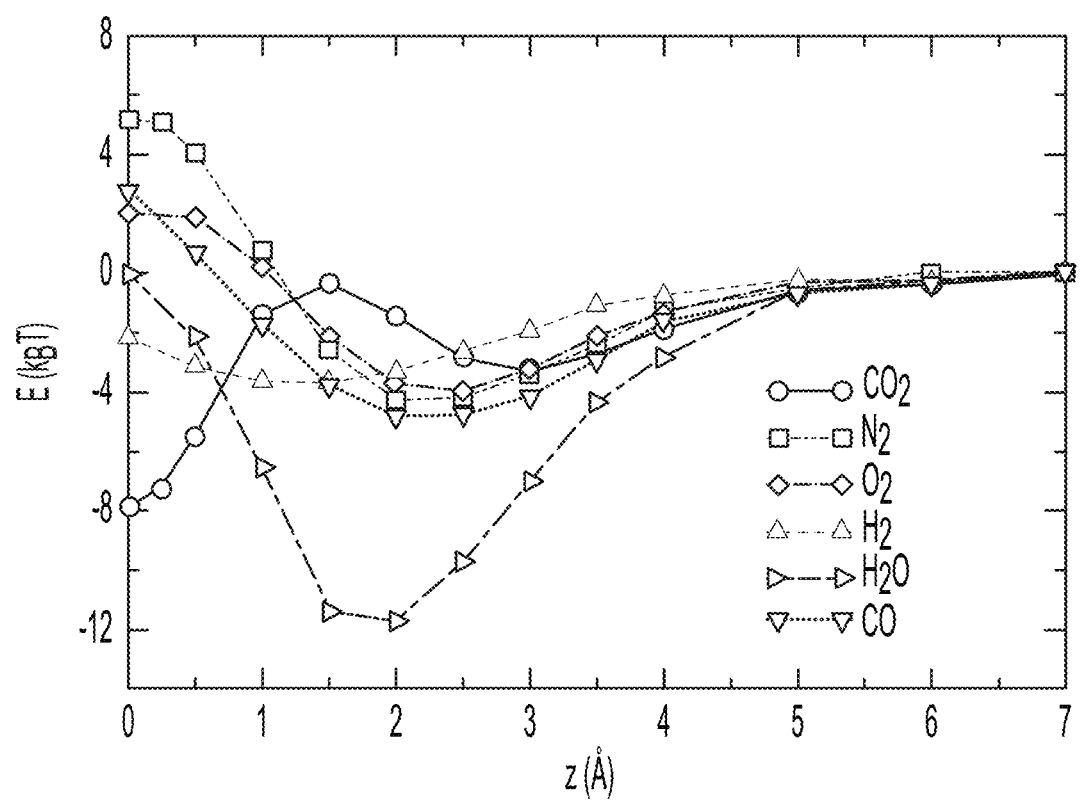
FIG. 4 shows potential energy distribution for various gas molecules as a function of distance to the crown pore ($\gamma$=0) in an embodiment.

Whether other gas molecules can go through the crown pore (when γ=0) can also be investigated. As shown in FIG. 4, potential energies for CO and $O_2$ at z=0 are repulsive, suggesting that the crown pore repels these two molecules. Water can go through the pore because the hydrogens on each side of the oxygen in water are positively charged and attract to the negative oxygens at the edge of the pore. Once one of the hydrogens goes in, the rest of the molecule passes through as well. Hydrogen can go through the pore as well because of its small size, so the crown-pore can be used to separate $H_2$ from gas molecules larger than $H_2$. FIG. 4 also includes results for $N_2$ and $CO_2$. Because the gas separation properties of the crown pore arise from its electronic charge distribution, the crown-pore can be used to selectively trap and transmit all molecules or ions that are isoelectronic to $CO_2$, such as nitrous oxide $N_2O$, cyanogen fluoride NCF and nitronium $NO_2$.

FIG. 4 shows potential energy distributions for various gas molecules as a function of distance to the crown pore (γ=0) in an embodiment. The potential energy distribution can differ dramatically when the graphene is stretched slightly. As the graphene stretches uniformly along both x and y axes (e.g. strain γ=1.0%), the potential barrier near the plane of the graphene decreases or disappears (FIG. 2) so that the potential energy landscape for $CO_2$ becomes purely attractive. At this point, $CO_2$ can enter the crown pore more easily. In an aspect, $CO_2$ does not have to go straight into the pore (as done in DFT calculations) because the potential well near the pore entrance can guide a $CO_2$ molecule that is not exactly aligned along the z axis to enter the pore.

Figure 5:
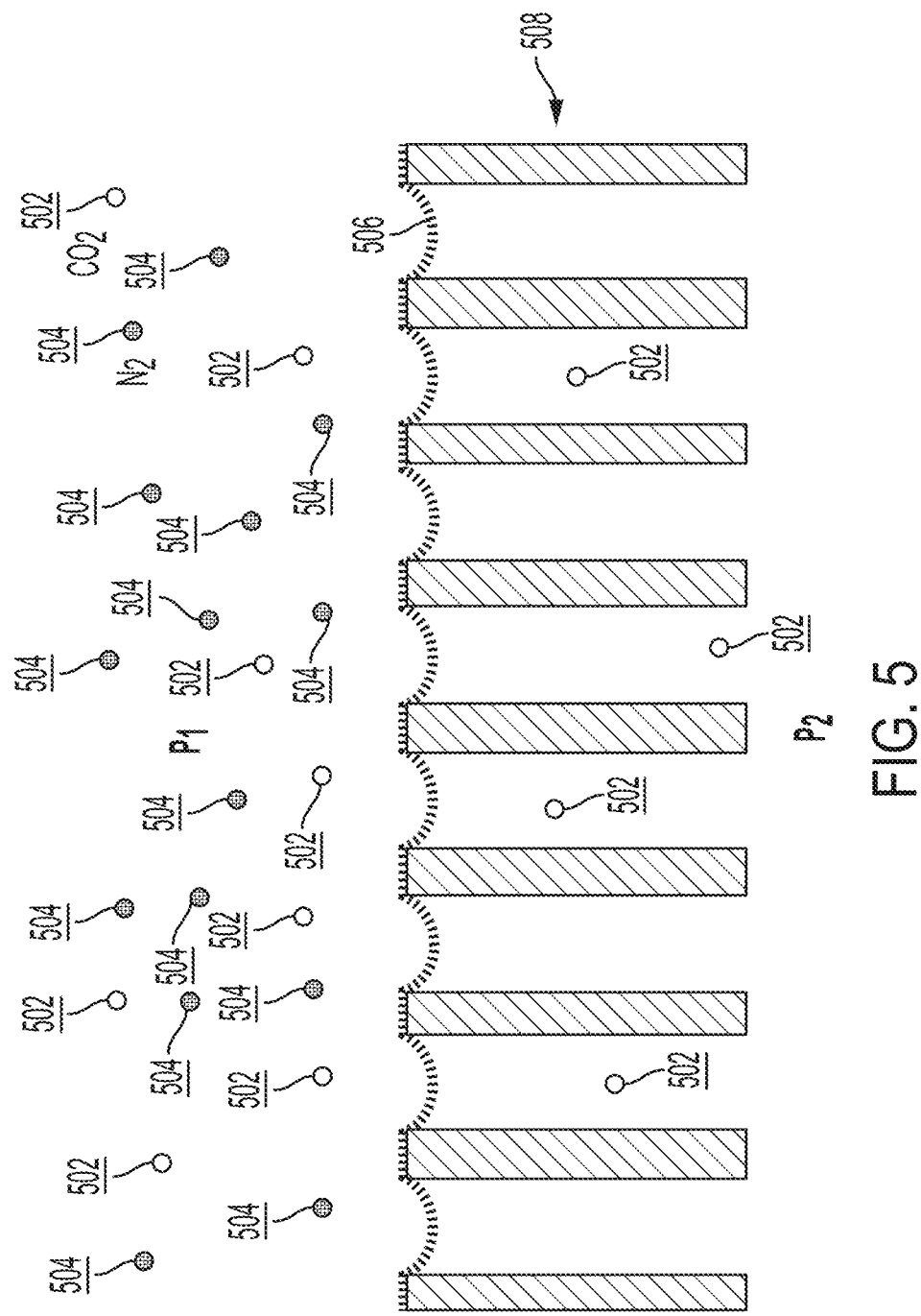
FIG. 5 shows a 2-dimensional (2D) cross-section of the graphene sheet attached to the porous support structure in an embodiment.

FIG. 5 illustrates in an embodiment, $CO_2$'s drifting through the crown-pore containing graphene sheet, driven by pressure difference ($P_1 > P_2$). Dots indicted by 504 represent $N_2$ molecules, and dots indicated by 502 represent $CO_2$ molecules. The crown-pore containing graphene is shown at 506, and the porous substrate is shown at 508.

In an embodiment, the graphene sheet or film can be stretched to a degree. In an embodiment, at a relative stretching of 1.0% or more (e.g., of graphene film), the crown pore passes $CO_2$ and $H_2O$ and repels $N_2$. In an embodiment, this can be a filter to separate $CO_2$ from $N_2$. For example, $CO_2$ passes through oxygen crown pores in graphene. The $CO_2$ and $H_2O$ can be separated from each other as well, for example, by lowering the temperature, at which point $H_2O$ condenses out of the gas and forms a liquid on the walls of the chamber, leaving $CO_2$ in the gas phase.

In an embodiment, the crown pore is symmetric with respect to the direction of molecular flow. $CO_2$ can pass back through the pore to the flue gas side as it can pass from the flue gas to the filtered side. In an embodiment, to get a net separation of $CO_2$ from $N_2$ in the flue gas, there can be a partial pressure difference between the two sides so that the partial pressure and $CO_2$ collision rate are higher on the flue gas side than the filtered side. Additionally, $CO_2$ molecules that become trapped in the crown pore can be knocked out by the next gas molecule that hits it, with the partial pressure difference.

Figure 7:
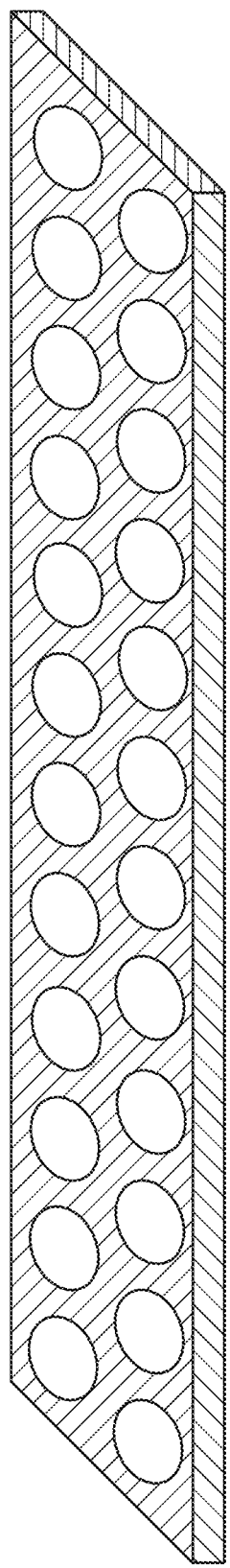
FIG. 7 shows an example of a porous substrate in an embodiment.

With a pressure difference between the two sides of the graphene sheet, a substrate can be provided to support the sheet and clamped to it. One embodiment of this support can be a hierarchical nanopore structure, where a graphene nanosheet with a high density of crown pores (e.g., 1 in every 5 nm-by-5 nm square) rests on a porous substrate. The porous substrate can be a honeycomb-like array of channels or an anodic aluminum oxide (AAO) pore-structure. A 2-dimensional (2D) cross-section of the graphene sheet attached to the porous support structure is shown in FIG. 5. Due to the pressure difference, the graphene sheet is bent towards/into substrate channels. This bending stretches the graphene sheet, which promotes the $CO_2$'s transition through the crown pores. The graphene's Young's modulus is about 2.4 TPa, which yields a strain of 0.15% in the bent graphene on a 6.6-mm-in-diameter pore under a pressure difference of 1 bar. Assuming a linear stress-strain relation at a small stretching, a pressure difference of 7 bar (assuming a diameter of pore in the substrate~6.6 mm) can be enough to yield a strain of 1.0% in the bent graphene sheet. This level of strain may further enhance the passage of $CO_2$ through the crown pore, as discussed above. FIG. 7 shows an example of a porous substrate, which can act as support for graphene film.

In an embodiment, with the crown pore graphene on a substrate, for example, shown in FIG. 5, the permeance to $CO_2$ can depend on the pressure. At a low pressure, the graphene is stretched less and the permeance is lower. Therefore, the graphene on a substrate can be operated as a valve where $CO_2$ passes through at high pressure and not at low pressure. This blocking at a low pressure can be used to block the backwards flow of $CO_2$ from the $CO_2$ receiving chamber into the flue gas side of the membrane. Thus, the pressure can act cyclically with filtering at high pressure when the partial pressure in the flue gas side of the membrane exceeds the partial pressure in the $CO_2$ receptacle outside the membrane, and with no backsplash of $CO_2$ from the receptacle into the flue gas side during low pressure. The membrane plus substrate can therefore be a one-way valve under these circumstances. The optimum pressure needed for filtering the $CO_2$ out of flue gas can be determined by measurement. In an aspect, it can be a function of how much each piece of graphene bends and changes the local strain as the pressure increases. A pressure on the flue gas side that is too much larger than the pressure on the outside could break the graphene. Experimentally, the maximum pressure difference can be as high as 100 bars.

The symmetry of the crown pore graphene filter also implies that crushed graphene fragments randomly filled with crown pores can be assembled into an irregular mesh to make a macroscopically amorphous filter. For example, it is possible to prepare thin membranes by spin casting graphene nanosheets onto a flat surface. This method can yield highly interlocked layer structures. Additionally, laminates can be formed with a collection of micron-sized graphene crystallites, forming an interlocked layered structure that can be air-tight. When introducing crown pores in these micron-sized graphene sheets, each pore in the mesh can pass $CO_2$ and repel $N_2$, providing a selectively diffusive barrier that separates these two gases. In another embodiment, a large crown-pore containing graphene sheet (e.g., 4-inches-by-4-inches) can be tiled on the porous substrate.

In an aspect, using crown pores, the pore structure in graphene is stable (e.g., cannot be further oxidized) and its performance can be theoretically quantified. It can also be expected to have a higher selectivity for $CO_2/N_2$ for a graphene membrane with crown-pores than for other porous membranes.

In an embodiment, temperatures less than 600 Celsius (C), which is generally the case for flue gas environments (e.g., in the chimney), can provide for the stability of the graphene.

Figure 6:
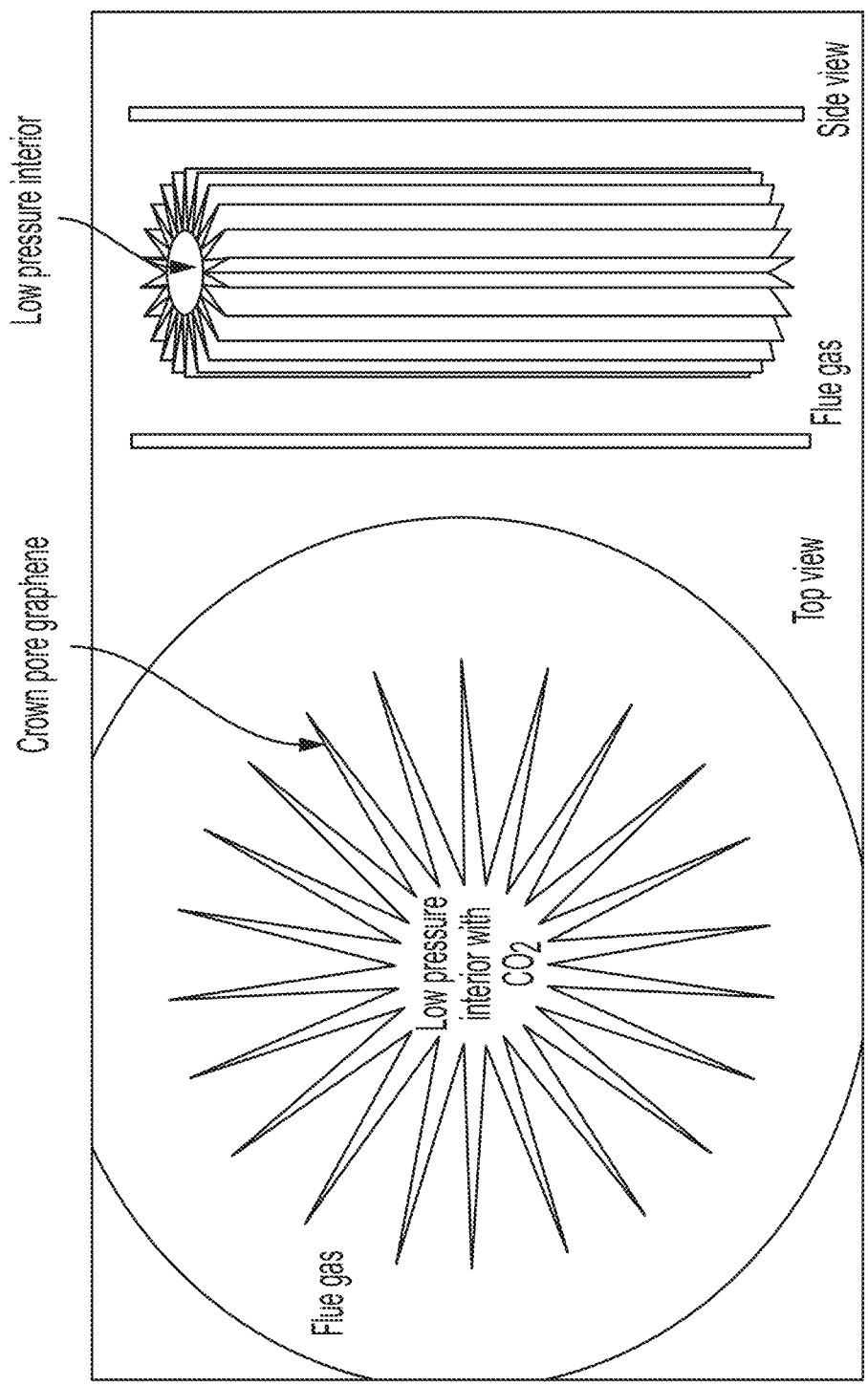
FIG. 6 shows an embodiment of a cylindrical device with zig-zag surface.

It can be possible to make multiple crown pores in a small graphene nanoflake and the density of crown pores in graphene can be as high as $10^{12}/cm^2$. Additionally, one can increase the surface area to allow more pores for $CO_2$ to pass through. FIG. 6 shows in an embodiment, a cylindrical zig-zag membrane with a lot of supported area to fit in a small volume. In an embodiment, the pressure at the center of the cylinder is lower than the one outside. In another embodiment, the pressure at the center of the cylinder is higher than the one outside. For example, the outside and the inside can have different pressures. Generally, for example, there can be some pressure difference between the inside and the outside regions. In an embodiment, in this device, $CO_2$ molecules can be driven from the outside, through the membrane and get into the central channel of the cylinder. The zigzag surface provides more surface area than a regular cylindrical surface. One benefit can be that the modular structure (FIG. 6) can minimize the down time during replacement of contaminated ones. For particles adsorbed on the graphene surface that cause the pore blockage, it is possible to wash them away from the graphene surface (with or without added chemicals). For the pore clogging by larger molecules (such as $N_2$), it is possible to blow air backwards (pure $H_2O$, $H_2$ or $CO_2$), to dislodge the larger molecule and unclog the pore. FIG. 6 shows an embodiment of a cylindrical device with zig-zag surface to allow more pores for $CO_2$ to go through.

An aspect of the flow rate for the crown pore in graphene is further described below. It may be shown that the crown pore graphene has a much higher permeance than those other membranes currently in use. In an aspect, an amount of crown-pore-containing graphene to filter the $CO_2$ from a coal power plant operating at 1 Giga Watt can be determined.

Figure 8:
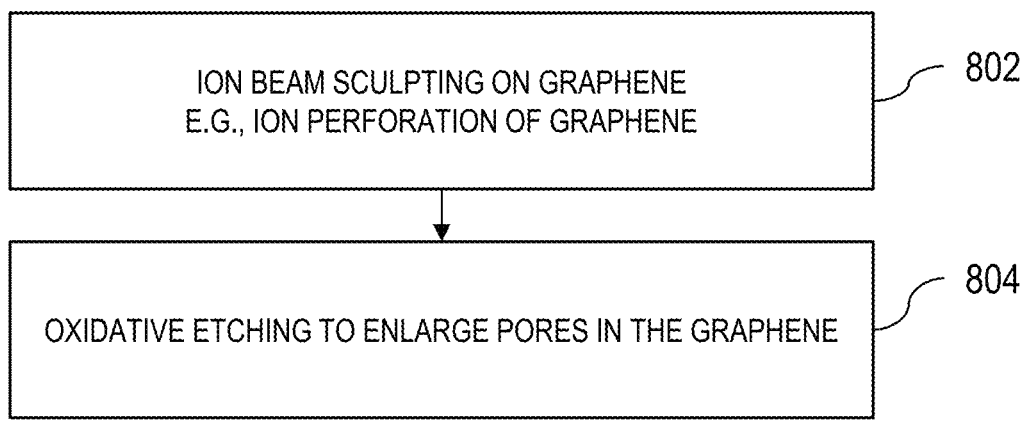
FIG. 8 is a flow diagram illustrating a fabrication process in an embodiment.

An example of a fabrication process can be as follows. Graphene supported by a porous substrate can be obtained, e.g., purchased. Then ion-beam-sculpting and subsequently enlargement by oxidative etching can be used to make crown pores in graphene. For example, ions can be accelerated toward the graphene to make holes in it, which subsequently react with oxygen in an oxidative etching step to make crown pores in graphene. The resulting crown pore can be fully oxidized and can be stable when being used to separate $CO_2$ from the flue gas. FIG. 8 is a flow diagram illustrating a fabrication process in an embodiment. At 802, ion-beam-sculpting is caused on a graphene sheet, which can be supported by a porous substrate. For example, ion perforation can be caused on a graphene sheet, which can be supported by a porous substrate. At 804, oxidative etching can be performed, which can enlarge pores. Carbon atoms exposed at the edges of the pores can be bonded with another element such as oxygen.

In an embodiment, defects (e.g., larger pores) in graphene, which may yield a lower selectivity, can be corrected or solved by applying multiple filters in series, to increase the purity of the final $CO_2$. For example, if the selectivity $(CO_2/N_2)$ is 95% and the input gas mixture has the ratio $N_2:CO_2=10:1$, after going through the first filter the ratio becomes 0.5263:1. Further sending this mixture through a second filter makes the ratio only 0.0277:1, suggesting that $CO_2$ is 97.23% pure.

Carbon capture can make considerable contribution to greener environment. For instance, since the beginning of the industrial revolution, large amounts of $CO_2$ have been put into the atmosphere. Existing membrane filters may have either a low permeance or a low selectivity for $CO_2$. In an aspect of separating $CO_2$ from flue gas, the functional group on the edge of a pore in graphene should not be oxidized because that would make it unstable to chemical reactions. In an embodiment, oxygen-terminated crown pores in graphene disclosed herein do not oxidize further and are therefore stable. Due to its chemical bonding, the oxygen-terminated crown pore is chemically inert, therefore it is suitable for the flue gas environment (containing $O_2$ and with a high temperature).

Figure 9:
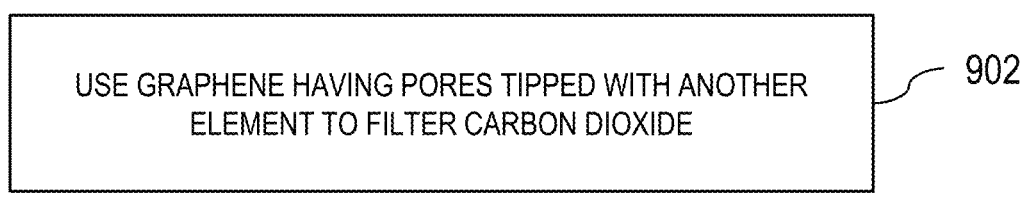
FIG. 9 is a flow diagram illustrating a method of capturing carbon dioxide in an embodiment.

FIG. 9 is a flow diagram illustrating a method of capturing carbon dioxide in an embodiment. At 902, carbon dioxide can be filtered from flue gas using graphene having pores tipped with another element. An example of another element can be oxygen. Another example can be nitrogen. Carbon dioxide in the flue gas is caused to enter or caused to be transported to an area of a second side of the graphene via at least one of the pores, for example, as described with reference to FIG. 5. In an embodiment, the method can also include applying higher pressure in the area of the first side than in the area of the second side. The method can also include using a first membrane filter as a first stage filter before using the graphene as a second stage filter.

In an embodiment, $CO_2$ from $N_2$ can be filtered using an unstretched graphene crown pore (CP) tipped with oxygen (O-CP). In an embodiment, $CO_2$ can be filtered from $N_2$ using an O-CP isotropically stretched by about 1.0%. In an embodiment, graphene with oxygen CPs can be placed on a porous substrate for support against driving pressure. For example, graphene with CPs can be placed directly on a porous substrate. In an embodiment, $CO_2$ permeance can be improved by stretching graphene more to open the O-CP more. An embodiment allows pressure-swing pumping of $CO_2$ through the O-CP membrane in which the positive flow rate is high at high pressure and the (unwanted) negative flow from backsplash is low at low pressure. In an embodiment, $H_2$ and $H_2O$ can be filtered from other gas using a graphene O-CP. In another embodiment, crushed or spin-cast O-CP graphene can be placed into an irregular mesh to filter $CO_2$ from $N_2$. In an embodiment, an interlocked multi-layered structure with O-CP graphene or O-CP graphene flakes can be used to allow a large pressure difference (e.g., 100 bar) to more quickly filter $CO_2$ from $N_2$. In another embodiment with high $CO_2/N_2$ selectivity, graphene crown pores tipped with nitrogen can be used. Another embodiment with high molecular selectivity can include using the Coulomb force exerted by graphene crown-like pores tipped with atoms other than oxygen and nitrogen that have an electronic charge as a result of their binding with the graphene. In an embodiment, a cylindrical device with a zig-zag membrane on the surface can be provided which permits more pores for $CO_2$ to enter from the outside (e.g., high pressure) to the inside (e.g., low pressure) of the cylinder. For example, the outside and the inside can have different pressures. For instance, the high pressure part of this zig zag pattern can be either inside or outside the graphene zig zag. For instance, the center of the zig zag can be lower pressure than the outside region, or the other way too, for example, the center of the zig zag can be higher pressure than the outside. Generally, for example, there can be some pressure difference between the inside and the outside regions. An embodiment can include an application of a two-stage filter where a low-selectivity conventional membrane filter is used before the high-selectivity graphene crown pore filter. An embodiment can include an application of several graphene crown pore filters in series to improve the total $CO_2$ purity.

Mass Flux Through the Crown Pores

By way of example, this discussion calculates the flow rate of $CO_2$ per unit area through crown pore graphene and estimates the total area needed to capture the $CO_2$ from a GigaWatt power plant burning coal. It also calculates the permeance, which is the flow rate per unit pressure difference, measured in units of $10^{-10}$ moles $m^{-2} s^{-1} Pa^{-1}$.

Consider the kinetic theory of gases, where the flux of molecules through a surface is $J=nv_m/4$ where $v_m$ is the mean thermal speed, $(8 k_B T/\pi m)^{0.5}$ for Boltzmann constant $k_B=1.38\times10^{-16}$ erg $K^{-1}$, mass m of the molecule, temperature T, and density n. With molecules on both sides of the surface going in each direction, $J=\Delta n_s v_m/4$ where $\Delta n_s = n_2 - n_o$ is the difference in select gas density on the two sides, subscript 2 indicating the flue gas side of the membrane while $n_o$ is the density of the same molecule outside. The total density on the flue gas side is denoted by n, so for a select molecule that is a fraction f of the total number of molecules on the flue gas side, $n_2=fn$ and $J=(fn-n_o)v_m/4$.

First find the density of all molecules at Standard Temperature and Pressure (STP). For example, use the perfect gas law, $P=nk_B T$ where $P=1.01\times10^6$ dyn/$cm^2$ at STP and T=273.15K. This gives a total density $n=2.68\times10^{19}$ $cm^{-3}$.

The mean thermal speed of $CO_2$ is $v_m=3.61\times10^4$ cm/s at STP for mean molecular weight equal to $(12+2\times16)\times1.67\times10^{-24}$ grams$=7.35\times10^{-23}$ grams. Let $\Delta n_s=n\Delta P_s/P$ for relative partial pressure difference of the select gas, $\Delta P_s/P$. The two sides of the filter are assumed to be at the same temperature, so $\Delta P_s=(n_2-n_0)k_B T$. For high pressures on the flue gas side, $n_2>>n_o$, in which case $\Delta P_s/P \approx f\Delta P/P$ where $\Delta P/P>>1$ is the compression factor.

These equations give the flux through a surface equal to $$J=0.25nv_m f\Delta P/P=2.42\times10^{23} f(\Delta P/P) \qquad (1)$$

at STP in units of molecules per second per square cm.

Now convert this number flux to a mass flux F by multiplying J by the mean mass per $CO_2$ molecule, which from above is $7.35\times10^{-23}$ grams. The result is $F=17.8f(\Delta P/P)$ grams $cm^{-2}s^{-1}$.

This is for an open surface. Multiply this by the fraction of the area of the graphene that is covered by crown pores, assuming each pore is a hole like this. The density of crown pores can be as high as $10^{12}$ $cm^{-2}$, and the size of a pore is 0.05 $nm^2=5\times10^{-16}$ $cm^2$. Considering an uncertainty factor E that is either larger than 1 if there is an attractive force to the hole or smaller than 1 if the $CO_2$ alignment and orientation has to be more precise than in the kinetic theory, the fraction of the area covered by the holes is $\eta=5\times10^{-4}E$.

Then the mass flux through the crown pores is approximately $$F=17.8\eta f(\Delta P/P)=8.9\times10^{-3}Ef(\Delta P/P)gcm^{-2}s^{-1}. \qquad (2)$$

The permeance is the flux in units of moles per unit area and time, per unit pressure difference. The same starting point is $J=\Delta nv_m/4$ for density difference $\Delta n$ and thermal speed $v_m$. For one Pascal of pressure difference, $\Delta P_1=10$ dy $cm^{-2}$, the density difference is $\Delta n=\Delta P_1/k_B T=2.65\times10^{14}\Delta P_1$ $cm^{-3}$ for T=273.15 K. Multiplying this by $v_m/4$ gives $J=2.39\times10^{18}$ molecules $cm^{-2}$ $s^{-1}$ $Pa^{-1}$, and dividing the result by Avogadro's number gives $J=4.0\times10^{-6}$ moles $cm^{-2}$ $s^{-1}$ $Pa^{-1}$. Considering now the fraction of the area that has a crown pore, $\eta=5\times10^{-4}E$, the permeance for $CO_2$ in crown pore graphene is the product of these, $J_{crown\ pore}=2\times10^{-9}E$ moles $cm^{-2}s^{-1}$ $Pa^{-1}$. In units of $m^{-2}$, this is $J_{crown\ pore}=2\times10^{-5}E$ moles $m^{-2}s^{-1}$ $Pa^{-1}$. In common units of $10^{-10}$ moles $m^{-2}s^{-1}$ $Pa^{-1}$, this is a permeance of $2.0\times10^5 E$.

This permeance is much larger than other known membranes such as the hollow fiber cellulose triacetate membranes, an asymmetric hollow fibre membrane and other known systems. The crown pore graphene disclosed herein has a much higher permeance than these other membranes currently in use. This implies a much smaller membrane area is needed, by the inverse of the permeance.

Area Needed to Capture $CO_2$ from a GW Coal Power Plant

Now calculate graphene area at the above crown pore density to filter the $CO_2$ from a coal power plant operating at 1 Giga Watt, which serves as a reference point.

According to the EIA (https colon slash slash (://) www dot (.) eia dot (.) gov slash (/) tools slash (/) faqs slash (/) faq dot (.) php?id74&t1T), coal in the United States of America produces $9.48\times10^{11}$ kWh of electricity and puts out $9.52\times10^8$ metric tons of $CO_2$. This implies that 1 GWh puts out $1.018 \times 10^9$ g $CO_2$ from coal burning. Dividing this by the number of seconds in an hour suggests that 1 GW puts out $2.83 \times 10^5$ g $CO_2$ $s^{-1}$.

Now estimate the area A of crown pore graphene needed to filter this $CO_2$ rate. Equate the product of the flux per unit area times the area, FA, to the emission rate of $CO_2$: $FA=2.83 \times 10^5$ g $s^{-1}$, where $F=8.9 \times 10^{-3} \in f(\Delta P/P)$ g $cm^{-2}$ $s^{-1}$. This gives $A=3.18 \times 10^3/(\in f \Delta P/P)$ $m^2$. With $f=0.2$ for the $CO_2$ fraction of molecules in flue gas and $\Delta P/P=50$ for the average compression factor above atmospheric pressure, $A=318/\in m^2$. Scaled to the power output S of the coal power plant, $A=318S/\in m^2$ for S in GW. Recall that $\in$ is a correction factor to convert the perfect gas equations for flux through a hole to the actual flux for $CO_2$ through a crown pore graphene membrane.

Natural gas emits less $CO_2$ per GW. According to the EIA again, natural gas produces $1.36 \times 10^{12}$ kWh in the USA and produces $5.6 \times 10^{14}$ grams of $CO_2$. This is $1.14 \times 10^5$ g $CO_2$ $s^{-1}$ for a GW, compared to $2.83 \times 10^5$ g $CO_2$ $s^{-1}$ for coal. The ratio is 0.41. Applying this ratio to the required graphene area, we get $129/\in m^2$ for a GW powered by natural gas.

The result is ~320 $m^2$ for a GW of coal power and ~130 $m^2$ for a GW of gas power, divided by the correction factor $\in$. Typical membrane areas for a GW power plant from known examples can be $10^3$ times larger, on the order of several times $10^5$ $m^2$, because the permeance of the membranes considered there are around $10^3$ times lower.

According to Carbon Brief (https colon slash slash (://) www dot (.) carbonbrief dot (.) org slash (/) mapped-worlds-coal-power-plants), there is 2.045 TW of coal-fired power in the world. That corresponds to a need for ~$6.5 \times 10^5$ $m^2$ of crown pore graphene, or 0.65 square kilometer. According to Forbes (https colon slash slash (://) www dot (.) forbes dot (.) com slash (/) sites slash (/) judeclemente slash (/) 2019 slash (/) 12 slash (/) 15 slash (/) global-natural-gas-electricity-is-gaining-on-coal slash (/)?sh=61ecdb407bfd), there is 1.7 TW of gas-fired power in the world. That corresponds to an additional need for ~$2.1 \times 10^5$ $m^2$ of crown pore graphene, or 0.21 square kilometer. The sum of these needs is 0.86 square km. According to ACS Material (https colon slash slash (://) www dot (.) acsmaterial dot (.) com slash (/) graphene-facts), one square meter of graphene weighs 0.77 milligrams, so 0.86 square km weighs 0.66 kg.

In an aspect, all of the $CO_2$ emission by power plants in the world may be captured by about one kilogram of crown pore graphene.

Two Stage Filtering

Crown pore graphene can be a filter for $CO_2$ that can have a very high selectivity over $N_2$. The amount of crown pore graphene can be reduced if another membrane with less selectivity filters the flue gas as a first step, passing the result with a high $CO_2$ fraction to crown pore graphene for a second filtering to make the $CO_2$ fraction even higher.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A carbon dioxide membrane filter comprising at least one graphene sheet interspersed with holes that have edge carbon atoms bonded with another element other than carbon, each of the holes making up a crown pore, wherein out of 18 carbon atoms that form a ring pattern around the crown pore, six carbon atoms are replaced with said another element to form the crown pore having a size of about 0.05 square nanometers.

2. The carbon dioxide membrane filter of claim 1, wherein said another element includes oxygen.

3. The carbon dioxide membrane filter of claim 1, wherein said another element includes nitrogen.

4. The carbon dioxide membrane filter of claim 1, further including a porous substrate wherein the graphene sheet is placed on the porous substrate for support against driving pressure.

5. The carbon dioxide membrane filter of claim 4, wherein the porous substrate has an array of channels, the graphene sheet being bent into the array of channels, wherein bending of the graphene sheet into the array of channels causes stretching of the graphene sheet.

6. The carbon dioxide membrane filter of claim 4, wherein the porous substrate has an anodic aluminum oxide pore-structure.

7. The carbon dioxide membrane filter of claim 1, wherein the crown pore is created by taking away six carbon atoms from the graphene sheet and replacing carbon edges of a hole created by removal of the six carbon atoms with oxygen atoms.

8. The carbon dioxide membrane filter of claim 1, wherein the graphene sheet has an irregular mesh shape.

9. The carbon dioxide membrane filter of claim 1, wherein the graphene sheet is stretched to enlarge the crown pore.

10. The carbon dioxide membrane filter of claim 1, wherein the graphene sheet is stretched relatively by at least one percent to enlarge the crown pore.

11. The carbon dioxide membrane filter of claim 1, wherein the crown pore is symmetric with respect to a direction of molecular flow of carbon dioxide through the crown pore.

12. The carbon dioxide membrane filter of claim 1, wherein the graphene sheet has a density of crown pores such that there exists at least one crown pore per every 5 nanometer by 5 nanometer square area.

13. The carbon dioxide membrane filter of claim 1, wherein the carbon dioxide membrane filter includes multiples of said at least one graphene sheet arranged in series.

14. A carbon dioxide membrane filter comprising a graphene sheet of carbon in a repeated hexagonal pattern, interspersed with holes that have edge carbon atoms bonded with another element other than carbon, wherein each of the holes makes up a crown pore, wherein out of 18 carbon atoms that form a ring pattern, six carbon atoms are replaced with atoms of said another element to form the crown pore having a size of about 0.05 square nanometers, wherein the graphene sheet is shaped to a cylindrical structure having a zig-zag surface pattern with the crown pores, wherein carbon dioxide is permitted to enter, via the crown pores, from a first side of the cylindrical structure to a second side of the cylindrical structure, wherein the first side and the second side have different pressures.

15. The carbon dioxide membrane filter of claim 14, wherein the first side is outside of the cylindrical structure and the second side is inside of the cylindrical structure, wherein the outside has higher pressure than the inside.

16. The carbon dioxide membrane filter of claim 14, wherein the first side is inside of the cylindrical structure and the second side is outside of the cylindrical structure, wherein the inside has higher pressure than the outside.

17. A method of carbon capture, comprising:
filtering carbon dioxide from flue gas using the carbon dioxide membrane filter recited in claim 1,
wherein the flue gas is provided in an area of a first side of the carbon dioxide membrane filter, and the carbon dioxide in the flue gas is caused to be transported to an area of a second side of the carbon dioxide membrane filter via at least one of the crown pores.

18. The method of claim 17, further including applying higher pressure in the area of the first side than in the area of the second side.

19. The method of claim 17, the method includes a two-stage filter wherein a first membrane filter is used before a second filter, the second filter comprising the carbon dioxide membrane filter.

20. The method of claim 17, wherein the carbon dioxide membrane filter is a multi-layered structure having layers of the graphene sheet.

* * * * *